Patented Dec. 13, 1927.

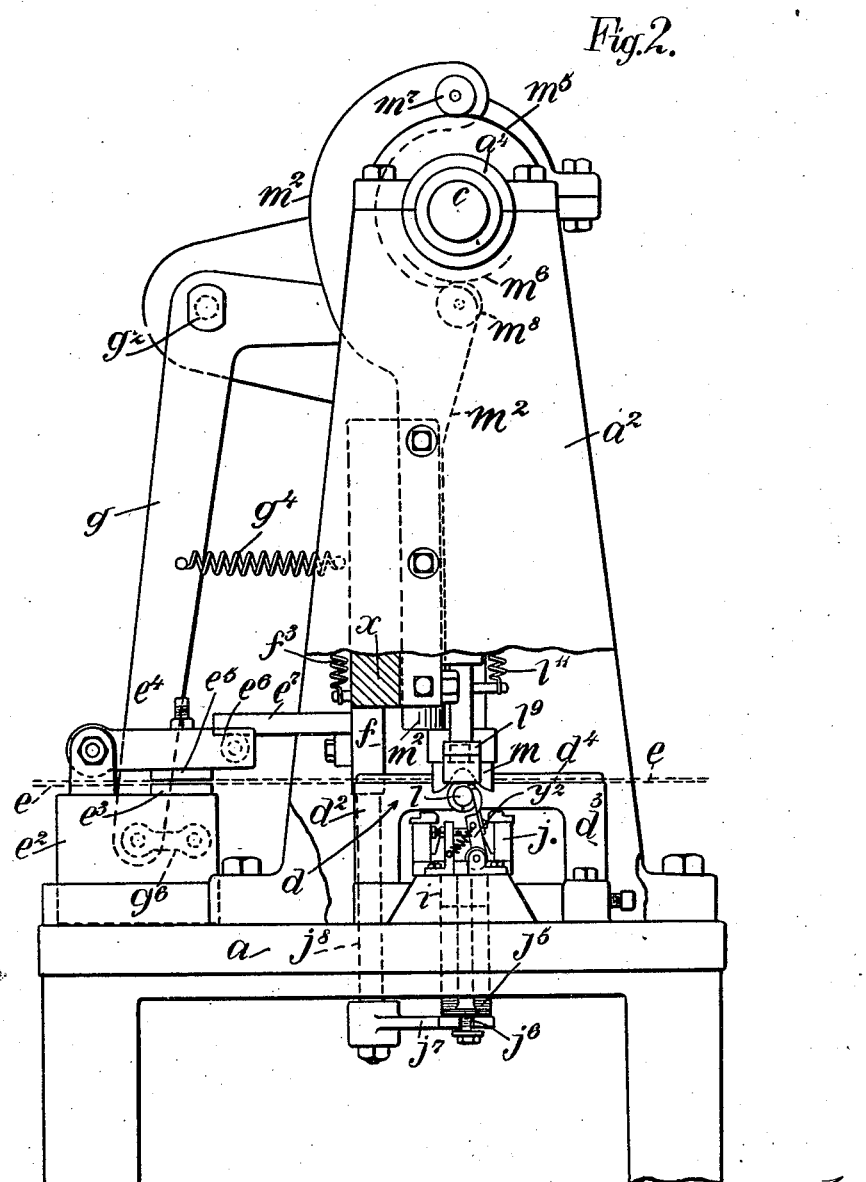

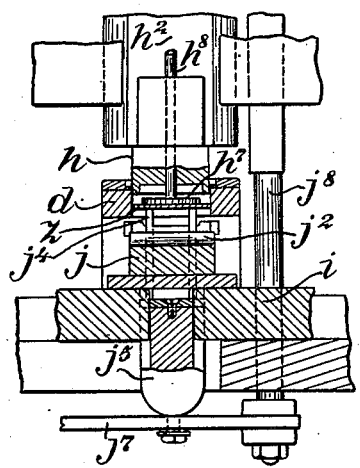
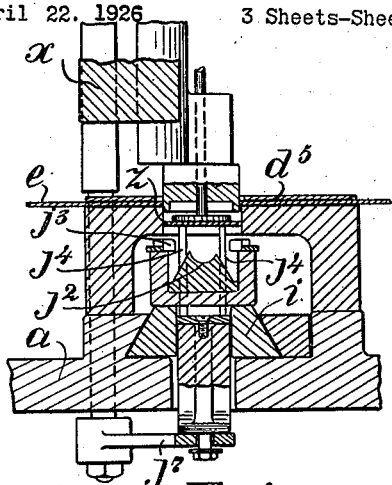
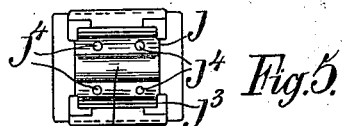
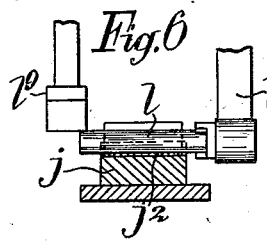
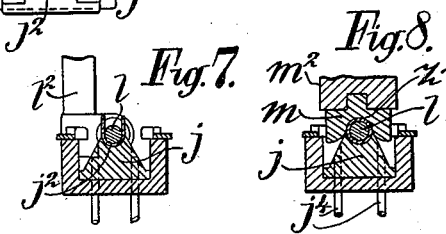
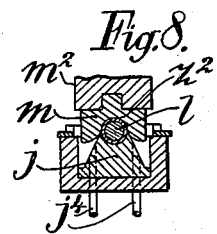
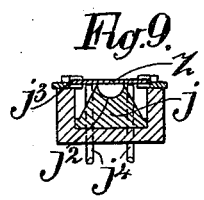
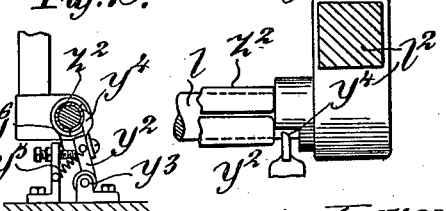

1,652,912

UNITED STATES PATENT OFFICE.

REGINALD SPILLER SETTEN, OF HOCKLEY, BIRMINGHAM, ENGLAND.

MACHINE FOR MANUFACTURING TUBULAR OR TUBE-LIKE ARTICLES.

Application filed April 22, 1926, Serial No. 103,896, and in Great Britain June 25, 1925.

This invention relates to a machine of the power press type for manufacturing small tubular or tube-like articles from strip or like metal, that is to say a machine having the characteristics of a power press in that as it has a number of vertically moving plungers or slides carrying tools which cooperate with complemental tools for shaping up the article from a blank, and for cutting out the blank from which said article is shaped.

The machine is adapted to produce articles such as plain tubes of short length having open joints such as used in paper clips, or metal pen holders having the usual nib grips punched or struck out from their walls, and other tubular or tube-like articles which are in themselves old.

The machine embodies a raising die supported upon the bed of the machine and adapted to receive a blank and position it above the substantially U-shaped shaping cavity of the die, a raising bar carried at one end by a plunger working above the raising die and which is adapted to descend to press the blank downwardly into the cavity of the raising die and to rigidly hold it there for a period of time, and a closing-in punch, also carried by a plunger above the raising die, and adapted to descend to inwardly close the sides of the U-shaped article over and onto the raising bar while said bar holds the partly shaped blank in the die. The closing-in punch and the raising bar then rise, and the tubular or tube-like article is stripped from the bar. Means are also provided on which the raising die is mounted and travelling between a blanking die and the raising bar for the purpose of feeding a blank to the raising die and carrying it under the raising bar. A stripper is also mounted upon the slide and moves into position, as the raising die moves to the blanking die, to strip the tubular article off the raising bar during the return movement of the die.

The machine also embodies means for accurately transferring a blank from the blanking die to the raising die and seating the blank in a set edge of the raising die.

The machine has a power driven horizontal shaft above the plungers or slides, and cams or the like are mounted upon the shaft, which cams are adapted to cooperate with springs for moving the plungers or slides downwardly and upwardly.

The metal strip from which the blank is to be cut out is fed to the machine at one end in a direction at right-angles to the direction of the main shaft and with the face of the strip horizontal. The first operation on the strip is over a fixed blanking die, but that portion of the strip to be cut out as a blank may, previous to the blanking operation, be impressed or pierced for certain purposes.

A machine embodying the invention is represented by the accompanying drawings, and this form of the invention will be hereinafter particularly described.

In said drawings:

Fig. 2 is a left-hand end elevation of the machine shown in Fig. 1, parts being shown in section.

Fig. 3 is a sectional detail of the blanking die, blanking punch and raising die, the latter being shown in position for transference of the blank.

Fig. 4 is a section of the parts shown in Fig. 3 at right-angles to the latter figure.

Fig. 5 is a plan of the raising die.

Fig. 6 is a sectional detail showing how the blank is raised by the raising die and raising bar.

Fig. 7 is a section at a right-angle to Fig. 6.

Fig. 8 is a sectional detail showing how the closing-in punch operates on the partly formed tube-like article, as shown in Figs. 6 and 7.

Fig. 9 is a sectional detail showing how the blank is positioned in the set edge of the raising die.

Fig. 10 and 11 are detail sections at right-angles to each other of the closing-in punch.

Figs. 12, 13 and 14 show details of the stripper, and how it operates to remove the shaped article from the raising bar, Fig. 14 being on a larger scale for clearness.

Figure 1:
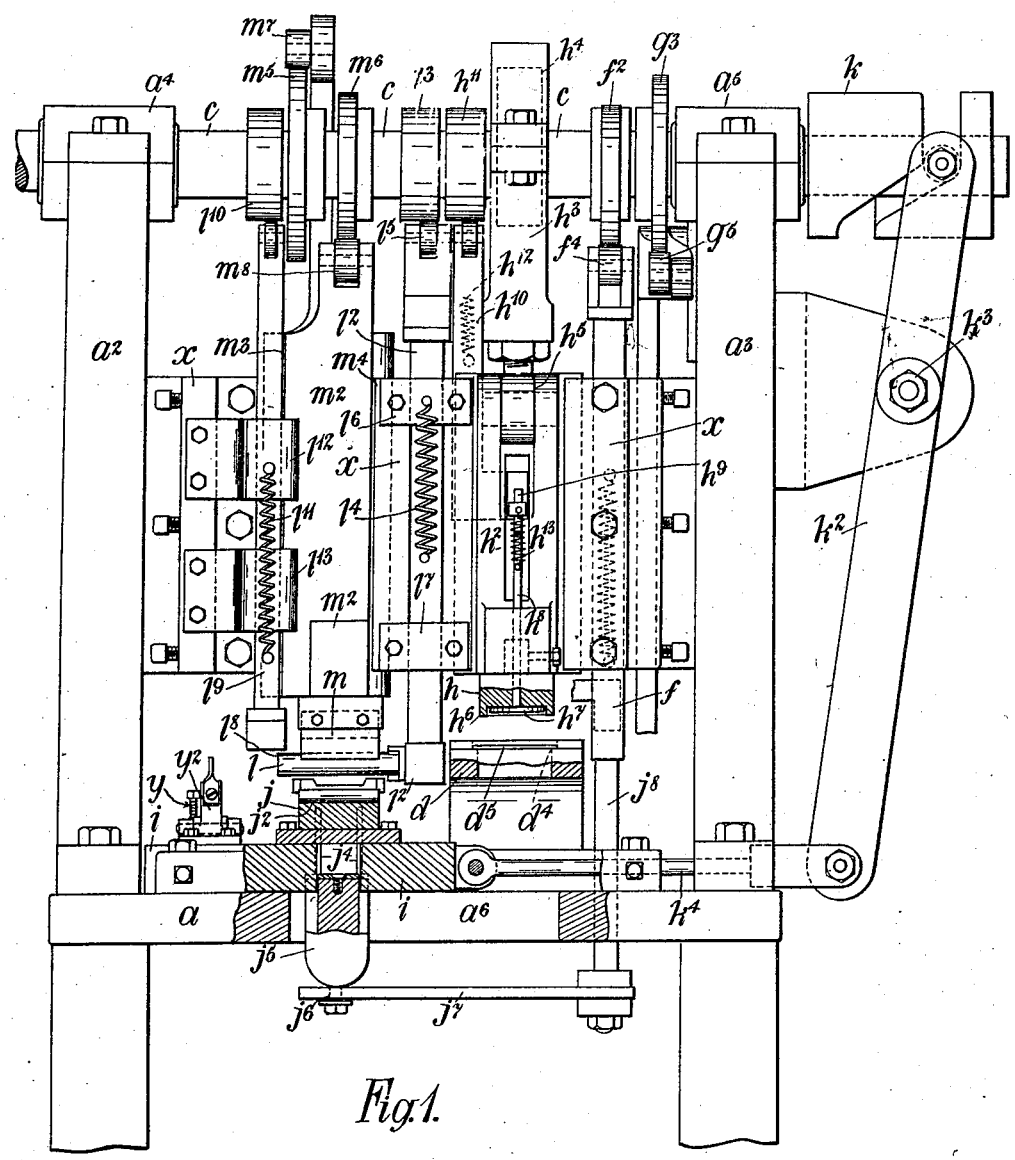
Fig. 1 is a front elevation, parts being shown in section.

The frame of the machine comprises a table $a$ supported upon legs and rigidly supporting standards $a^2$, $a^3$, which are provided at $a^4$, $a^5$, with fixed bearings for a horizontal shaft $c$. Mounted upon this power driven shaft are a number of cams and eccentrics, for purposes hereinafter described.

Fixed upon the table $a$ is a blanking die $d$ elevated from said table by end supports $d^2$, $d^3$, so that a raising die, to be hereinafter described, can be positioned below said blanking die.

A metal strip $e$, from which the blank is to be cut, is fed over the blanking die and guided over the cutting edge $d^4$ of said die by a groove $d^5$. The strip is fed to the groove at right-angles to the direction of the shaft $c$, as clearly shown by Fig. 2, and by devices, also shown in Fig. 2 now to be described.

$e^2$ is a slide movable on the table, $a$, at right-angles to the shaft, $c$, and carrying a gripping piece, $e^3$, and also carrying a pivoted arm, $e^4$, having a complemental adjustable gripping piece, $e^5$, said arm also carrying a roller $e^6$. The gripping pieces $e^3$, $e^5$ are caused to grip the scrap of the strip $e$ by downward pressure of a horizontal peg $e^7$ against the roller $e^6$, which peg is rigidly mounted upon a vertical slide $f$. The slide $f$ is moved downwardly by a cam $f^2$ on the shaft $c$ and upwardly by a spring $f^3$, the slide being suitably guided in a part $x$ of the frame, and carries a roller $f^4$ making contact with the cam $f^2$, while the spring $f^3$ is preferably of the coiled type extending between the slide $f$, and the part $x$. The slide $e^2$ is operated by a large cranked lever, $g$, fulcrumed to the frame at $g^2$ and operated by a cam $g^3$ and by a spring $g^4$, a roller $g^5$ on the lever contacting the cam $g^3$, and a link $g^6$ pivotally connecting the one end of the lever to the slide $e^2$. The feeding of the strip $e$ is intermittent and timed to the other parts of the machine, as will be hereinafter explained.

Working above the blanking die $d$ is a blanking punch $h$ carried by a slide $h^2$ guided in the frame part $x$ and positively moved up and down by an eccentric strap $h^3$ working on an eccentric $h^4$ carried by the shaft $c$, the rod of the eccentric strap $h^3$ being connected with the slide at $h^5$. The cutting edge $h^6$ of this blanking punch cooperates with the blanking die to cut a blank from the strip $e$.

Associated with the blanking punch $h$ is an inner pressure plate $h^7$ (Figs. 3 and 4) having a vertical stem $h^8$ slidably guided in the punch $h$. The upper end of the stem is adapted to contact an abutment $h^9$ adjustably carried upon the lower end of a slide $h^{10}$ guided vertically in the frame part $x$ and moved downwardly by a cam $h^{11}$ on the shaft $c$ and upwardly by a spring $h^{12}$. An extensible coiled spring $h^{13}$ normally holds the stem $h^8$ against the adjustable abutment $h^9$. The pressure plate $h^7$ moves downwardly with the punch $h$, being carried by it, but additionally moves downwardly, independent of the punch, after the blank has been cut by the punch, as will be hereinafter explained. The slide $h^{10}$ moves independently of the slide $h^2$ but relative thereto, so that the pressure plate $h^7$ only operates at a certain moment and for a certain period, as will be also hereinafter explained. The lower end of the slide $h^{10}$ projects through a free slot in the slide $h^2$ from the back, and the abutment $h^9$ is adjustable on said lower end for convenience in setting the stem to the slide.

Mounted upon the table $a$ is a slidable carrier $i$ for a raising die $j$ and its associated parts, and for a stripper device $y$, the latter to be hereinafter described. The die $j$ is fixed to the carrier $i$, and the carrier works in V grooves of the table, as shown in Fig. 2. The movement of the slidable carrier $i$ is parallel with the main shaft and into two positions, the one as illustrated in Fig. 1 beneath a raising bar hereinafter described, and the other beneath the blanking die $d$ as represented by Figs. 3 and 4. Said slidable carrier is actuated by a cam $k$ on the main shaft through a lever $k^2$ fulcrumed to the standard $a^3$ at $k^3$ and coupled to the slide by the pivoted link $k^4$, the timing of movement bringing the raising die $j$ underneath the blanking die $d$ to receive a cut out blank $z$ and afterwards carry the blank away for further operation. The raising die $j$ provides a shaping cavity $j^2$, and above this cavity a set edge $j^3$ for positioning the blank $z$ above the cavity, clearly shown by Figs. 5 and 9. Four vertical pegs $j^4$ pass through this raising die from below, clear of the shaping cavity, and are moved up and down as one piece with a stem $j^5$ working in the carrier slide $i$ and connected at $j^6$ with a slotted arm $j^7$ rigidly carried upon the lower end of an extension $j^8$ of the vertical slide $f$, the table $a$ being slotted at $a^6$ to accommodate the traverse of the stem $j^5$ with the slide $i$. The four pegs $j^4$ are raised and lowered to co-operate with the pressure plate $h^7$, hereinbefore described, to transfer a cutout blank $z$ from the blanking die $d$ to the set edge $j^3$ of the raising die $j$, in manner represented by Figs. 3 and 4. The shaping cavity $j^2$ in the raising die is semi-cylindrical and directed parallel to the shaft $c$.

Disposed above the raising die $j$ is a raising bar $l$, and above the rising bar an upper punch $m$, both to co-operate with the raising die $j$ to raise a blank into U-shape and afterwards close its sides to form an open tube surrounding the raising bar $l$, to be subsequently stripped from said bar. The raising bar $l$ is horizontally disposed to the shaping cavity $j^2$ of the die $j$, and is rigidly carried at its one end by a plunger $l^2$ moved downwardly by a cam $l^3$ on the shaft $c$ and upwardly by a spring $l^4$, the plunger carrying a roller $l^5$ which contacts with the cam $l^3$ and being guided in its movement in the frame part $x$ at $l^6$, $l^7$. The operation of the raising bar $l$ upon the blank within the raising die $j$ is clearly represented by Figs. 6 and 7, and since said raising bar has a free end $l^8$ to enable the article to be stripped, said end is backed up, while the blank is being shaped by the lower end of a subsidiary plunger $l^9$ moved downwardly by a cam $l^{10}$ on the shaft $c$ and upwardly by a spring $l^{11}$, this subsidiary plunger being given by its cam and spring a small amount of movement beyond the movement of the plunger $l^2$ to first back up the raising bar before the movement of the latter and leave said raising bar before stripping commences, as clearly illustrated by Figs. 1 and 6. The subsidiary plunger $l^9$ is guided in the frame part $x$ at $l^{12}$ and $l^{13}$.

The upper punch $m$, which is a closing-in punch and will be hereinafter referred to as such, is for closing the side of the U-shaped article inwardly over the raising bar $l$ while the U-shaped article is held stationary in the raising die $j$, by the continued pressure of the raising bar in the shaping cavity $j^2$ of the raising die, to form the article into an open tube. This closing-in punch $m$ is carried by a plunger-slide $m^2$ suitably guided at $m^3$, $m^4$, in the frame part $x$, and positively moved up and down by two cams $m^5$, $m^6$ on the shaft $c$, which contact with the rollers $m^7$, $m^8$ carried by the plunger slide $m^2$. The shape of the closing-in punch $m$ is clearly shown in Figs. 10 and 11, and its operation is illustrated in Fig. 8, it commencing its work while the U-shaped article is firmly held in the raising die $j$ by the raising bar $l$, as clearly represented by Figs. 6 and 7.

The tubular or tube-like article so shaped around the raising bar $l$ is stripped from said raising bar by the stripping device $y$ during the travel of the raising die $j$ to the blanking die $d$ and back again. This stripping device, carried by the carrier slide $i$, comprises (Figs. 1, 12, 13 and 14) an arm $y^2$ pivoted at $y^3$ to a small bracket fixed to the carrier $i$ and having a shaped free end $y^4$, and a spring $y^5$ to normally pull the arm inwardly against an adjustable stop pin $y^6$. The arm has a ratchet pawl-like action against the tubular article $z^2$, in that as its free end wipes over said article in one direction of the travel of the slidable carrier $i$ and engages the inner end of said tubular article to slide said article off the raising bar $l$ as the slidable carrier $i$ moves in the reverse direction, all of which is amply illustrated by Figs. 1, 2, 12, 13 and 14.

It will be understood that the strip $e$ is fed forward intermittently to the blanking die $d$, and that the blanking punch $h$ operates on the strip while stationary to cut from the strip a suitable blank, by which time the raising die $j$ is in position underneath the blanking die $d$ ready to receive the blank in its set edge $j^3$. The pegs $j^4$ rise and the pressure plate $h^7$ descends to grip the blank between them, in the manner represented by Figs. 3 and 4, and afterwards move, carrying the blank with them, so that said blank is lowered into the set edge of the raising die, as indicated by Fig. 9, after which the blanking punch $h$ and the pressure plate $h^7$ move back to normal positions, so that the strip may feed forward again for a fresh blank. While the blanking punch and the pressure plate rise and the strip is fed the raising die $j$, having the blank in position over it, is moved underneath the raising bar $l$, which then descends, while the raising die $j$ is held stationary, to force the blank into the shaping cavity $j^2$, and therefore into a U cross-section, as shown by Figs. 6 and 7, after which, and while said raising bar $l$ is still holding the partly formed article in the raising die, the closing-in punch $m$ descends to close in the sides of the U and form around the raising bar an open tubular or tube-like article, as represented by Fig. 8. The closing-in punch then lifts, followed by the raising bar $l$ on which is the tubular article, into the positions represented by Fig. 1 (less the tubular article), when the raising die $j$ again moves to the right to its position underneath the blanking die to receive a further blank. During this latter movement of the raising die the stripper device $y$ has travelled over the tubular article to get behind its inner end, as represented in Figs. 12, 13 and 14, so that on the next movement of the slidable carrier $i$ the tubular article is stripped off the raising bar $l$, before the raising die $j$ comes again to its position for raising the blank.

It will be understood that the cams are shaped and timed to carry out all the aforesaid operations automatically in proper sequence, and that various adjustments would be provided to enable the proper settings to be made, these adjustments not being shown in the drawings.

The invention is primarily a machine for making an open tubular or tube-like article from a blank in a particular way and by a particular means, and this has been amply described and illustrated, but it is to be understood that the metal to form the blank may be operated upon previously to raising, or the tubular article may be operated upon after its formation; for example the machine can be set up and used for making just a plain tubular length, or it can be set up and used for making a tubular metal pen holder having nib grips, in which case the strip is either pierced, before the blank is cut out, to form the nib grips or the blank is additionally shaped with extensions, the pierced out parts or extensions, as the case may be, being additionally shaped up after the tubular article has been stripped off the raising bar.

It is convenient to impress the strip from which the metal blank is to be cut out with indicative matter such as "Made in England", and this may be done between the blanking die and the blanking punch or otherwise.

Having now described my invention what I claim and desire to secure by Letters Patent is:—

1. In a machine for manufacturing tubular or tube-like articles from strip or like metal, a raising die having a shaping cavity substantially U-shaped in cross-section, means associated with said raising die adapted to receive a blank and position it above said cavity, a raising bar working above the raising die and adapted to descend against the raising die to press the blank downwardly into the cavity of the raising die and to rigidly hold it there for a period of time, a closing-in punch movable against said raising bar to inwardly close the sides of the U-shaped article over and onto the raising bar while said bar holds the partly shaped article in the raising die, and means for stripping the tube-like article from the raising bar, substantially as described.

2. In a machine for manufacturing tubular or tube-like articles from strip or like metal, a raising die having a substantially U-shaped cavity, means associated with said raising die and adapted to receive a blank and position it above said cavity, a raising bar working above the raising die and adapted to descend to press the blank downwardly into the cavity of the raising die and to rigidly hold it there for a period of time, a closing-in punch above the raising die and raising bar and adapted to descend to inwardly close the sides of the U-shaped article over the raising bar while said bar holds the partly shaped article in the cavity of the raising die, a blanking die and punch, means for alternately moving the raising die beneath the blanking die to receive a blank and beneath the raising bar and closing-in punch, means for intermittently feeding a strip to the blanking die and means for subsequently stripping the formed tube-like article from the raising bar, substantially as described.

3. In a machine for manufacturing tubular or tube-like articles from strip or like metal, a raising die having a substantially U-shaped cavity, means associated with said raising die adapted to receive a blank and position it above said U-shaped cavity, a raising bar working above the raising die and adapted to descend against the latter to press the blank downwardly into the cavity of the raising die and to rigidly hold it there for a period of time, a closing-in punch above the raising die and raising bar and adapted to descend to inwardly close the sides of the U-shaped article over the raising bar while said bar holds the partly shaped article in the raising die, a blanking die and punch, a carrier for alternately moving the raising die beneath the blanking die to receive a blank and to the raising and closing-in punch, means for intermittently feeding a strip to said blanking die, and a stripper mounted on said carrier and adapted, when the raising die is moved from the blanking die to the raising bar, to strip a tubular article already formed on the raising bar off said bar, substantially as described.

4. In a machine for manufacturing tubular or tube-like articles from strip or like metal, a raising die having a cavity substantially U-shaped in cross-section, means to receive and support a blank above the cavity of said raising die, a raising bar working above the raising die and movable against said raising die to press the blank downwardly into the cavity of the latter and rigidly hold it there for a period of time, a closing-in punch movable against the raising bar for inwardly closing the sides of the U-shaped article over the raising bar while said bar holds the partly shaped article in the cavity of the raising die, a blanking die and punch, a slidable carrier supporting said raising die for alternately moving the raising die beneath the blanking die to receive a blank and beneath the raising bar and closing-in punch, means for intermittently feeding a strip to said blanking die and a stripper device mounted on said carrier and adapted, during the movement of the raising die from the raising bar to said blanking die, to strip a formed tubular article off the raising bar substantially as described.

5. In a machine for manufacturing tubular or tube-like articles from strip or like metal, a raising die having a cavity substantially U-shaped in cross-section, means associated with said raising die and movable relatively to said cavity to receive a blank and position it above said cavity, a raising bar working above the raising die and adapted to descend to press a blank downwardly into the cavity of the raising die and to rigidly hold it there for a period of time, a closing-in punch above the raising die and raising bar and movable against said raising bar to inwardly close the sides of the U-shaped article over and onto the raising bar while said bar holds the partly shaped article in the cavity of the raising die, a blanking die, a blanking punch associated with said blanking die, a pressure plate movable in said blanking punch and cooperative with the blank receiving means of the raising die to hold a cut-out blank above the cavity, means for alternately moving the raising die to the blanking die and the raising bar and closing-in punch, means for intermittently feeding a strip to the blanking die, and a stripper device associated with the raising die moving means and operative during the movement of the raising die to strip a formed tubular article off the raising bar.

In testimony whereof I have hereunto set my hand.

REGINALD SPILLER SETTEN.